W. J. HISS.
CONDUIT OR CABLE CLAMP AND BRIDLE RING.
APPLICATION FILED OCT. 25, 1920.

1,387,489. Patented Aug. 16, 1921.
2 SHEETS—SHEET 1.

INVENTOR
William J. Hiss
BY
Alanh Johnson
ATTORNEY

W. J. HISS.
CONDUIT OR CABLE CLAMP AND BRIDLE RING.
APPLICATION FILED OCT. 25, 1920.
1,387,489.
Patented Aug. 16, 1921.
2 SHEETS—SHEET 2.
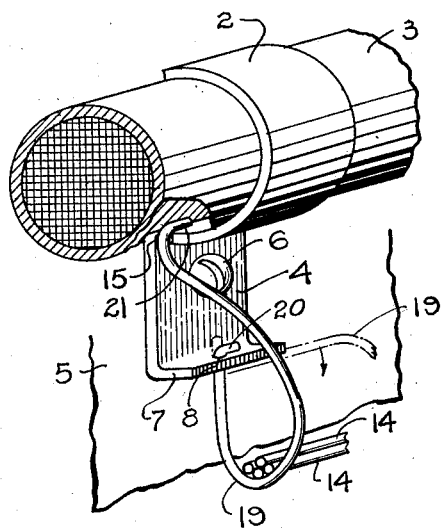
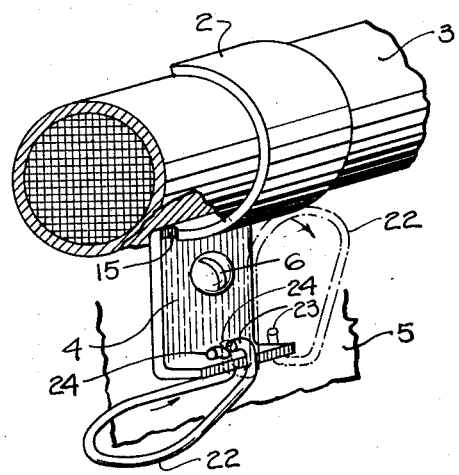
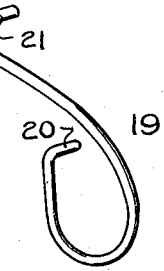
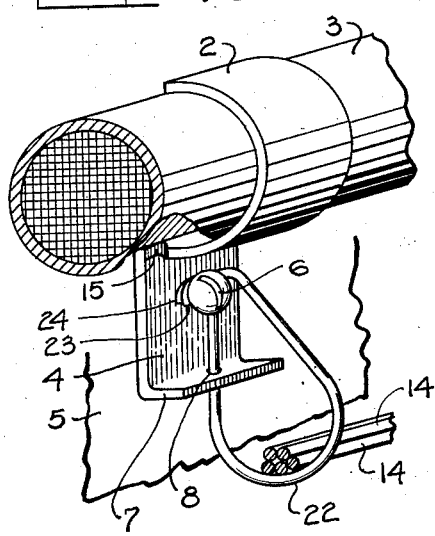
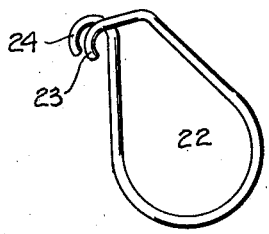
INVENTOR
William J. Hiss
BY
Alan M. Johnson
ATTORNEY

UNITED STATES PATENT OFFICE.

WILLIAM J. HISS, OF NEW YORK, N. Y.

CONDUIT OR CABLE CLAMP AND BRIDLE-RING.

1,387,489.

Specification of Letters Patent.   Patented Aug. 16, 1921.

Application filed October 25, 1920. Serial No. 419,478.

*To all whom it may concern:*

Be it known that I, WILLIAM J. HISS, a citizen of the United States, residing in the borough of Manhattan, city, county, and State of New York, have made certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp having a portion of the base bent out from the surface to the base and provided with a hole or aperture through which a bridle ring may be threaded, both ends of the bridle ring hooking into the dead space on the hook portion of the conduit or cable clamp.

My invention further relates to the combination of such a conduit or cable clamp and bridle ring in which one hook of the bridle ring engages with, and is supported by, the bent portion of the base, while the other hook of the bridle ring hooks into the dead space.

My invention further relates to the combination of such a conduit or cable clamp and bridle ring in which the bridle ring is threaded through said opening in the base, one hook of the bridle ring hooking into the dead space while the other hook hooks over the securing screw.

My invention further relates to the combination of such a conduit or cable clamp in which the bridle ring after being fed through the opening in the base has both its hooks hooked over the securing screw.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claims.

In the figures, in which I have shown different embodiments of my invention, the same reference numerals refer to similar parts in the several figures.

Fig. 7 is a perspective view of another modified form of my invention in which the bridle ring has one hook hooking into the dead space of the conduit or cable clamp, the other hook hooking over the flange or bent portion of the base;

Fig. 8 is a perspective view of the bridle ring shown in Fig. 7;

Figure 1:
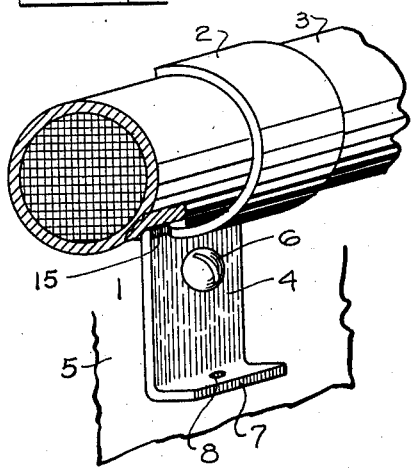
Figure 1 is a perspective view of my conduit or cable clamp and of a cable which it supports.

Fig. 9 is a perspective view of still another modification of my invention in which both ends of the bridle ring hook over the head of the securing screw. In this figure the first attaching position of the bridle ring is shown in dotted lines. The second attaching position is shown in full lines;

Fig. 10 is a perspective view, similar to Fig. 9, showing the bridle ring in its operative position;

Fig. 11 is a perspective view of the bridle ring shown in Figs. 9 and 10.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with a hook portion 2 to support a conduit or cable 3, and a base 4 to lie against a wall or other suitable support 5. The clamp is held in position by the securing screw 6. The base 4 is provided with a supporting member to assist in supporting a bridle ring. Preferably the supporting member is in the form of a flange 7, which I provide with an opening or hole 8.

When the cable or conduit 3 is first installed it is held as shown in Fig. 1. A portion of the circumference of the cable contacts with the face of the wall 5 leaving a triangular space 9, Fig. 3, which, for purposes of description, I have termed a "dead space," for the reason that the conduit or cable, due to its contour, does not fill this space.

Weeks, months or years after the original installation, should the traffic load upon the cable 3 become excessive and the telephone or telegraph engineers desire to increase the capacity of the installation without going to the expense of taking down this cable and installing a larger one, the increased traffic load can be carried by simply attaching any one of my different bridle rings to this conduit or cable clamp 1. I have shown in the drawings several different forms, but of course it is to be understood that my invention is not to be limited to the particular forms shown by way of illustration.

Figure 2:
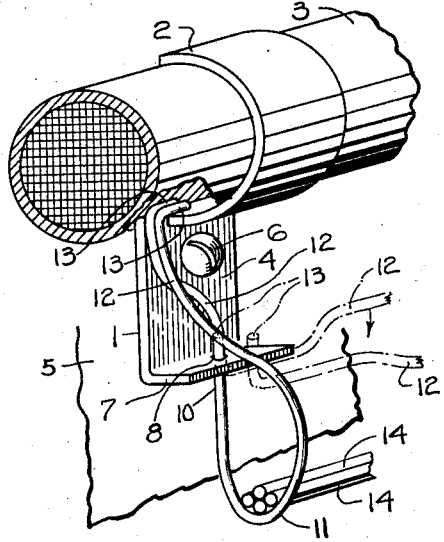
Fig. 2 is a perspective view of the conduit or cable clamp shown in Fig. 1, together with one form of my bridle ring. This bridle ring is shown in dotted lines in its first attaching position, and in full lines completely attached to the conduit or cable clamp.
Figure 4:
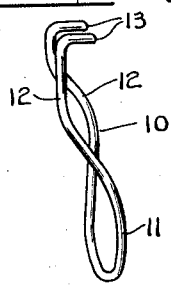
Fig. 4 is a perspective view of the form of bridle ring shown in Figs. 2 and 3.
Figure 3:
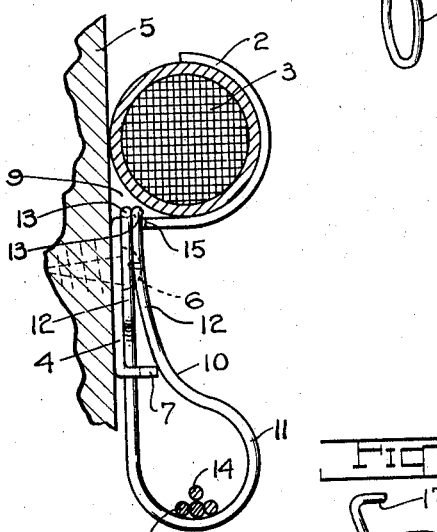
Fig. 3 is a side elevation of the conduit or cable clamp and bridle ring; the cable and supporting wall being shown in vertical section.

In Figs. 2, 3 and 4, I have shown the preferred form of my invention in which I use the bridle ring 10, Fig. 4. This bridle ring has a loop 11, and two arms 12, 12 each of which are provided with hooks 13, 13. To attach the bridle ring it is brought into the position shown in dotted lines, Fig. 2, in which one position of the hooks 13 is threaded through the opening 8 in the flange 7, while the other hook 13 engages on the exterior of the flange. The bridle ring is then swung down 90° in the direction of the arrow until both hooks 13, 13 are at right angles to the hole 8. The bridle ring is then pushed up vertically until the hooks 13, 13 are adjacent to the dead space 9. They are then bent or sprung into the position shown in full lines in Figs. 2 and 3 so that runs of bridle wires 14, 14 may be threaded through the loop 11.

To remove the bridle ring 10 it is simply necessary to grasp the arms 12, 12 and pull the hooks 13, 13 from the dead space 9, and then reverse the operation previously described when the bridle ring and bridle wires 14, 14 may be used in some other location should this be desired.

I preferably, though not necessarily, provide the conduit or cable clamp 1 with a cut-away portion or notch 15 adjacent to the meeting surfaces of the hook portion 2 and the base 4, as shown in Fig. 1 and other figures. Into this notch or recess 15, if one is employed, the ends of the arms 12, 12 become seated. The sides of the notch tend to prevent lateral movement of the hooks 13, 13 within the dead space 9 and prevent the hooks contacting with the surface of the cable 3. The cable will therefore not be cut or marred by the hooks 13, 13 regardless of the strains that may be thrown on the bridle ring.

Figure 6:
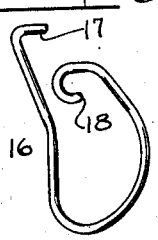
Fig. 6 is a perspective view of the bridle ring shown in Fig. 5.
Figure 5:
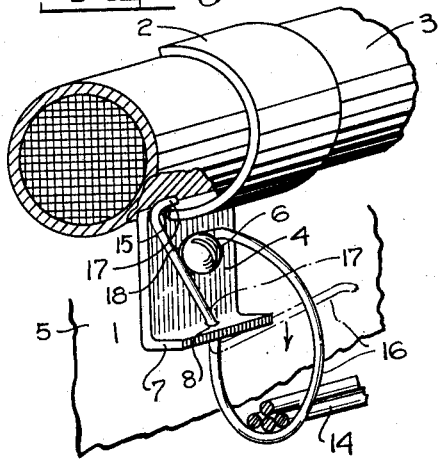
Fig. 5 is a perspective view of a modified form of my invention in which one hook of the bridle ring hooks into the dead space, while the other hook hooks over the head of the securing screw.

Instead of having a bridle ring both hooks of which hook into the dead space 9, I may form my bridle ring as shown in Figs. 5 and 6. In this form of my invention the bridle ring 16 has a hook 17 which is threaded through the hole 8 in the clamp 7 as shown in dotted lines in Fig. 5. It is then swung down some ninety degrees, until the hook 17 is at right angles to the hole 8. It is then moved vertically until the hook 17 is hooked into the dead space 9. The other hook 18 is then sprung over the head of the securing screw 6. The screw is then tightened to securely hold the hook 18 to the base 4.

Another form of my invention comprises a bridle ring 19, Fig. 8, having the hooks 20 and 21. This bridle ring is attached to the conduit or cable clamp shown in Fig. 7 by first threading the hook 20 vertically through the hole 8 in the flange 7 as shown in dotted lines, Fig. 7. The bridle ring is then swung down from the dotted position some 90°, when the hook 21 is hooked into the dead space 9, the hook 20 remaining in contact with the flange 7 as shown in Fig. 7.

In still another form of my invention, shown in Figs. 9, 10 and 11, I form a bridle ring 22, Fig. 11, having hooks 23 and 24. To position this bridle ring the hook 24 is threaded through the opening 8 in the flange 7 as shown in dotted lines in Fig. 9, the two hooks 23 and 24 being sprung apart as shown in dotted lines in that figure. The hook is then swung down, as indicated by the arrow, until the bridle ring assumes the position shown in full lines in said figure. It is then swung back and raised vertically so as to get the hooks 23 and 24 over the head of the securing screw 6, Fig. 10. The screw 6 is then tightened so as to clamp these two hooks between the head of the securing screw and the base 4.

Having thus described this invention in connection with illustrative embodiments thereof, to the details of which I do not desire to be limited, what is claimed as new and what is desired to secure by Letters Patent is set forth in the appended claims.

What I claim is:—

1. The combination of a conduit or cable clamp having a hook portion to support a conduit or cable and a base to lie against a wall or other suitable support, the base being provided with means to coöperate with a bridle ring, and a bridle ring coöperating with said means, said bridle ring having one or more hooks adapted to hook into the dead space on the hook portion of the clamp.

2. The combination of a conduit or cable clamp having a hook portion to support a conduit or cable and a base to lie against a wall or other suitable support, the base being provided with means to coöperate with a bridle ring, and a bridle ring coöperating with said means, said bridle ring having two hooks both of which are adapted to hook into the dead space on the hook portion of the clamp.

3. A new article of manufacture comprising a conduit or cable clamp provided with a hook portion to hold and support a conduit or cable and with a base to lie against a wall or other suitable support, the base being provided with a member extending out from the surface of the base and provided with a vertical opening to coöperate with a bridle ring, the hook portion of the clamp being cut away to form a notch adjacent the meeting edges of the base and hook portions to receive one or both hooks of a bridle ring, said bridle hook or hooks being adapted to lie in the dead space of the conduit or cable clamp.

4. The combination of a conduit or cable clamp having a hook portion to support a conduit or cable and a base to lie against a wall or other support, the base being provided with an integral flange having a vertical opening to receive a bridle ring, and a bridle ring mounted in said opening in the flange and having two hooks both of which are adapted to hook into the dead space on the conduit or cable clamp.

WILLIAM J. HISS.

Witnesses:
M. R. RYAN,
A. M. WILLIAMS.